(12) United States Patent
Minami et al.

(10) Patent No.: US 8,525,499 B2
(45) Date of Patent: Sep. 3, 2013

(54) CONSTANT CURRENT SWITCHING POWER SUPPLY

(75) Inventors: Eiji Minami, Nagano (JP); Takayuki Ohki, Nagano (JP)

(73) Assignee: Minebea Co., Ltd., Nagano (JP)

( * ) Notice: Subject to any disclaimer, the term of this patent is extended or adjusted under 35 U.S.C. 154(b) by 475 days.

(21) Appl. No.: 12/985,928

(22) Filed: Jan. 6, 2011

(65) Prior Publication Data
US 2011/0181266 A1    Jul. 28, 2011

(30) Foreign Application Priority Data
Jan. 26, 2010  (JP) .................................. 2010-013941

(51) Int. Cl.
*G05F 1/56*    (2006.01)
(52) U.S. Cl.
USPC ........................................................ 323/282
(58) Field of Classification Search
USPC ........................................................ 323/282
See application file for complete search history.

(56) References Cited

U.S. PATENT DOCUMENTS
2010/0327832 A1*  12/2010  Nishida .......................... 323/282
2011/0181266 A1*  7/2011  Minami et al. ................ 323/311

FOREIGN PATENT DOCUMENTS
JP    2009-134946 A    6/2009
JP    2009-148107 A    7/2009

* cited by examiner

*Primary Examiner* — Jeffrey Sterrett
(74) *Attorney, Agent, or Firm* — Carrier Blackman & Associates, P.C.; Joseph P. Carrier; William D. Blackman

(57) ABSTRACT

There is provided a switching power supply circuit which receives a voltage from a direct current voltage source and supplies a direct current power to a load part. The circuit includes a switching element, a current detection circuit which is serially connected to the switching element, and which converts a current flowing in the switching element into a voltage, a control circuit which outputs a switch driving signal to control an ON/OFF operation of the switching element such that a current flowing in the load part becomes constant, a reference voltage generation circuit which generates a reference voltage proportional to an ON duty of the switch driving signal, and an error amplification circuit which outputs error information between a voltage output from the current detection circuit and the reference voltage. The control circuit adjusts the ON duty of the switch driving signal based on the error information.

8 Claims, 3 Drawing Sheets

CONSTANT CURRENT SWITCHING POWER SUPPLY

BACKGROUND OF THE INVENTION

1. Field of the Invention

The present invention relates to a switching power supply circuit that is used for electronic devices such as an LED driver and the like, and more particularly, to a switching power supply circuit having a function of performing a constant current control on output current.

2. Description of the Related Art

Conventionally, a switching power supply circuit is known as a small, light and high-efficient power supply circuit and is used as a power source for various electronic devices. In general, the switching power supply circuit is often used as a constant voltage source that supplies a constant voltage to a load. However, the switching power supply circuit is also used as a constant current source that supplies constant current to a load (for example, refer to JP-A-2009-148107).

In a switching power supply device shown in FIG. 1 of JP-A-2009-148107, a main switching element is used as a so-called high-side switching element that is provided at a positive terminal side of an input power source. In this device, a current detection resistance is serially connected to a load to directly detect output current that flows in the load. Thus, it is possible to perform a constant current control relatively easily. However, since the main switching element is provided at the high side, a driving circuit of the switching element is relatively expensive.

In view of the problem, it is suggested an illumination device using a switching power supply circuit in which a main switching element is used as a so-called low-side switching element that is provided at a negative terminal side of an input power source (for example, refer to JP-A-2009-134946).

In JP-A-2009-134946, a switching power supply circuit unit including a voltage dropping chopper circuit is switching-controlled by a control circuit IC that also serves as a switching element and performs a current limit control that turns off the switching element when a peak value of current flowing in the switching element exceeds a threshold current.

However, the switching power supply circuit unit described in JP-A-2009-134946 has following problems.

That is, in the switching power supply circuit unit, when an input voltage is denoted as Vin, an output voltage is denoted as Vout, an inductance value (L value) of a choke coil is denoted as L1 and a switching period of the switching element is denoted as Ts, a relationship between output current Io and threshold current Ip is expressed by an equation (1).

$$Io = Ip - (1/2) \times ((Vin - Vout)/L1) \times (Vout/Vin) \times Ts \quad (1)$$

As can be seen from the equation (1), when the inductance value (L1) of the choke coil is sufficiently high, the output current Io becomes approximately same as the threshold current Ip. However, when the inductance value (L1) of the choke coil is increased, a size of the choke coil becomes larger and more expensive. Thus, there is a limit to an increase in the inductance value (L1) of the choke coil. Therefore, the output current Io is changed as the input voltage Vin or output voltage Vout changes.

SUMMARY OF THE INVENTION

The present invention has been made to solve the problem described above, and it is an aspect of the present invention to provide a switching power supply circuit having a simple circuit configuration and capable of precisely performing a constant current control on output current irrespectively of a change of an input voltage or output voltage.

According to an illustrative embodiment of the present invention, there is provide a switching power supply circuit which is configured to receive a voltage from a direct current voltage source and supply a direct current power to a load part. The switching power supply circuit includes: a switching element; a current detection circuit which is serially connected to the switching element, and which is configured to convert a current flowing in the switching element into a voltage and detect the voltage; a control circuit which is configured to output a switch driving signal to the switching element to control an ON/OFF operation of the switching element such that a current flowing in the load part becomes constant; a reference voltage generation circuit which is configured to generate a reference voltage proportional to an ON duty of the switch driving signal; and an error amplification circuit which is configured to output error information between a voltage output from the current detection circuit and the reference voltage, to the control circuit. The control circuit is configured to adjust the ON duty of the switch driving signal based on the error information.

In the above switching power supply circuit, the control circuit may include: a driving pulse generation circuit which is configured to generate a driving pulse signal; and a driving circuit which is configured to receive the driving pulse signal and output the switch driving signal for driving the switching element. The reference voltage may be generated based on a first output signal output from the driving pulse generation circuit or a second output signal output from the driving circuit.

In the above switching power supply circuit, the driving pulse signal may be used as the first output signal to have an ON duty, a phase and a frequency all same as those of the driving pulse signal.

In the above switching power supply circuit, the first output signal may be a pulse signal having an ON duty same as that of the driving pulse signal and having a phase and/or a frequency different from those of the driving pulse signal.

In the above switching power supply circuit, the switch driving signal may be used as the second output signal to have an ON duty, a phase and a frequency all same as those of the switch driving signal.

In the above switching power supply circuit, the switching element may be a low-side transistor.

The above switching power supply circuit may further include: a voltage dropping type converter circuit including: the transistor; and a rectification smoothing circuit provided at a high side of the transistor.

In the above switching power supply circuit, the current detection circuit may include: a current detection element which is configured to convert a current flowing in the switching element into a voltage and detect the voltage; and a low pass filter which is configured to average the detected voltage.

According to the above configuration, it is possible to provide a switching power supply circuit having a simple circuit configuration and capable of precisely performing a constant current control on output current irrespectively of a change of an input voltage or output voltage.

DETAILED DESCRIPTION

Hereinafter, illustrative embodiments of the present invention will be described with reference to the drawings.

First Illustrative Embodiment

Figure 1:
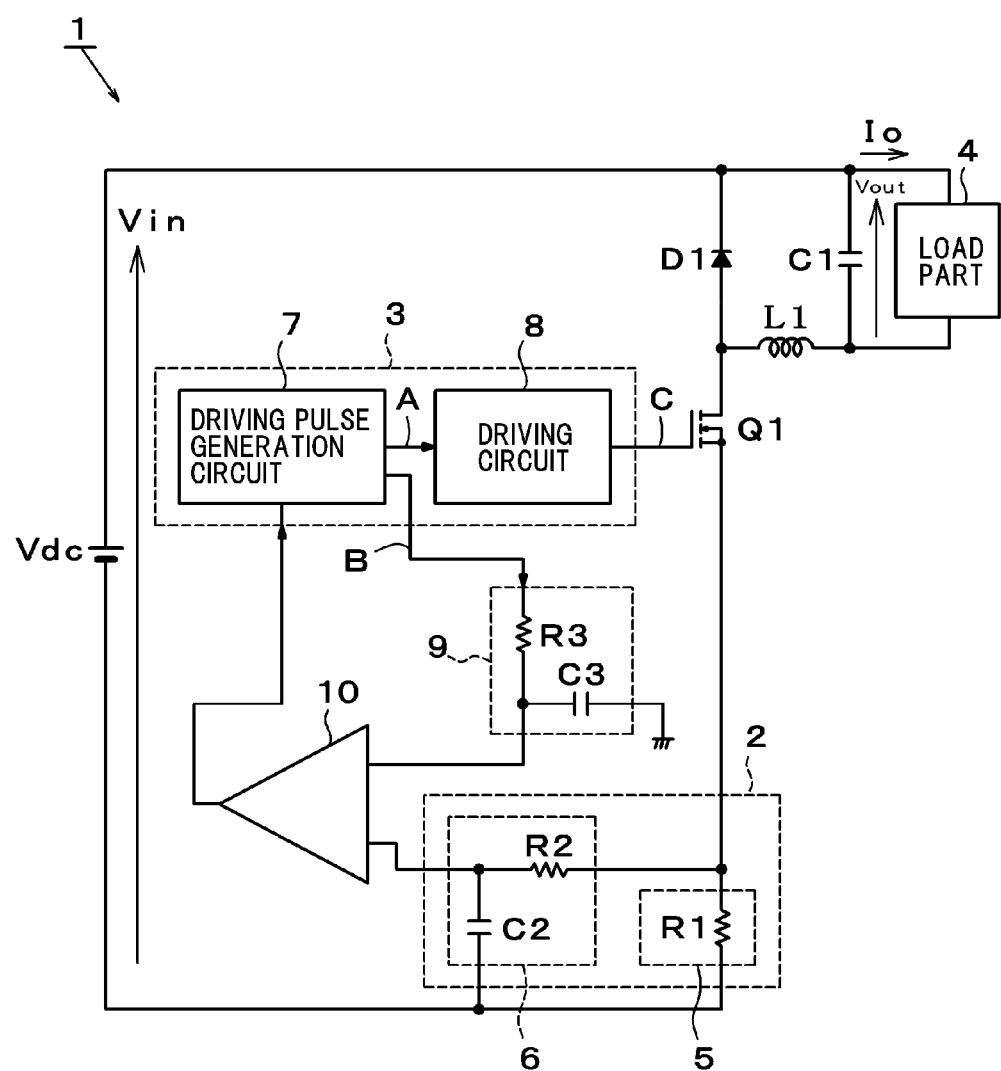
FIG. 1 is a circuit diagram showing a switching power supply circuit according to a first illustrative embodiment of the present invention.

FIG. 1 is a circuit diagram showing a switching power supply circuit according to a first illustrative embodiment of the present invention.

As shown in FIG. 1, a switching power supply circuit 1 is a switching power supply circuit of a constant current control mode, which power-converts a direct current voltage input from a direct current voltage source Vdc and supplies the direct current power to a load part 4 and controls an output current flowing in the load part 4 to be constant. The switching power supply circuit 1 comprises: a rectification smoothing circuit including a diode D1, a capacitor C1 and a choke coil L1; a switching element Q1 which is a MOSFET; a current detection circuit 2 which is serially connected to the switching element Q1; and a control circuit 3 which can control an ON/OFF operation of the switching element Q1.

The current detection circuit 2 includes: a current detection element 5 having a resistance element R1; and a low pass filter 6 having a resistance element R2 and a capacitor C2. The control circuit 3 has a driving pulse generation circuit 7 and a driving circuit 8.

In the switching power supply circuit 1 of this illustrative embodiment, the switching element Q1 and the rectification smoothing circuit provided at a high side of the switching element Q1 configure a voltage dropping type converter circuit. The switching element Q1 is used as a so-called low-side switching element that is provided at a negative terminal side of the direct current voltage source Vdc.

In the load side, the capacitor C1 is connected in parallel to the load part 4, the choke coil L1 is serially connected to the parallel circuit, and the diode D1 is connected in parallel to the parallel and serial circuits. A cathode terminal of the diode D1 is connected to a positive terminal of the direct current voltage source Vdc together with one end of the capacitor C1 and an anode terminal is connected to the other end of the capacitor C1 through the choke coil L1.

The switching element Q1 has a drain terminal that is connected to the anode terminal of the diode D1, a source terminal that is connected to the current detection element 5 of the current detection circuit 2 and a gate terminal that is connected to an output terminal of the driving circuit 8 of the control circuit 3.

The switching power supply circuit 1 further includes a reference voltage generation circuit 9 and an error amplification circuit 10. As described below, the inventive concept of the present invention is applied in a circuit configuration of the circuits and peripheral circuits.

Next, a basic circuit operation of the switching power supply circuit 1 will be described.

When a direct current voltage is applied from the direct current voltage source Vdc, the control circuit 3 starts an operation and the driving pulse generation circuit 7 generates a driving pulse signal A having a rectangular waveform for Pulse Width Modulation (PWM) control and outputs the signal to the driving circuit 8.

When the driving pulse signal A is input from the driving pulse generation circuit 7, the driving circuit 8 outputs a switch driving signal C having a rectangular waveform to the switching element Q1. The switching element Q1 repeats a switching operation (ON/OFF operation) by the switch driving signal C and an input voltage, which is supplied from the direct current voltage source Vdc, is converted into an output voltage by the rectification smoothing circuit having the diode D1, the capacitor C1 and the choke coil L1, so that power is supplied to the load part 4.

When the switching element Q1 performs the ON operation, a current flowing from the direct current voltage source Vdc passes to the load part 4, the capacitor C1, the choke coil L1 and the switching element Q1 and flows to the ground via the current detection element 5 of the current detection circuit 2. A pulse current flowing in the switching element Q1 is converted into a pulse voltage by the current detection element 5, which is then detected. The detected pulse voltage is averaged by the low pass filter 6 and then converted into a direct current voltage, which is then output to the error amplification circuit 10. A magnitude of the direct current voltage, which is output from the current detection circuit 2, is proportional to an ON duty of the switch driving signal C that is input to the switching element Q1.

Figure 2:
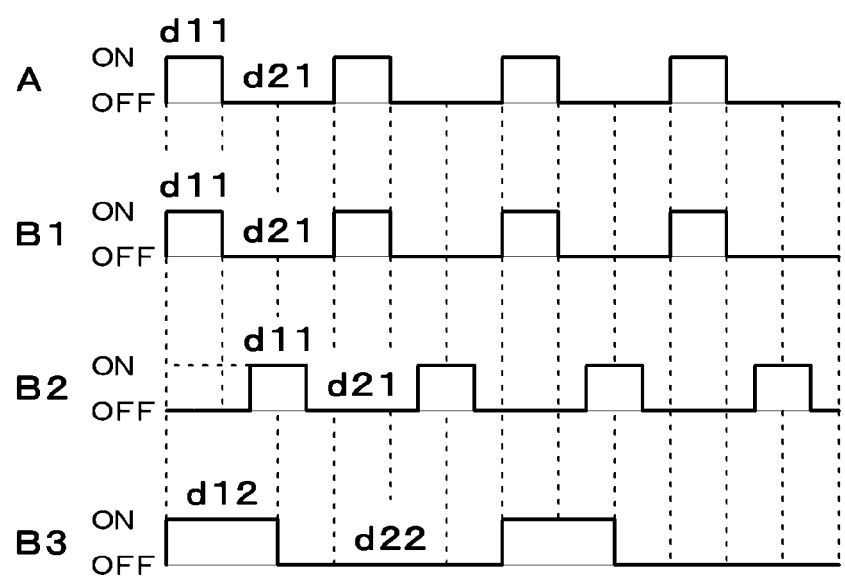
FIG. 2 is a view showing a relationship between a driving pulse signal A, which is output from a driving pulse generation circuit to a driving circuit, and an output signal (first output signal) B (B1 to B3), which is output from the driving pulse generation circuit to a reference voltage generation circuit, in the switching power supply circuit according to the first illustrative embodiment.

Next, a circuit operation of the reference voltage generation circuit 9 will be described with reference to FIG. 2. FIG. 2 is a view showing a relation between a driving pulse signal A, which is output from the driving pulse generation circuit 7 to the driving circuit 8, and an output signal (first output signal) B (B1 to B3), which is output from the driving pulse generation circuit 7 to the reference voltage generation circuit 9, in the switching power supply circuit 1.

As shown in FIG. 2, in the control circuit 3, when a driving pulse signal A of a rectangular waveform having ON time of d11 and OFF time of d21 is output from the driving pulse generation circuit 7 to the driving circuit 8, an output signal (first output signal) having an ON duty, a phase and a frequency same as those of the driving pulse signal A, such as output signal B1, is output from the driving pulse generation circuit 7 to the reference voltage generation circuit 9. The reference voltage generation circuit 9 has a low pass filter including a resistance element R3 and a capacitor C3, and the first output signal B1, which is input from the driving pulse generation circuit 7, is averaged by the low pass filter and converted into a direct current voltage, which is then output to the error amplification circuit 10, as a reference voltage. A magnitude of the direct current voltage (reference voltage), which is output from the reference voltage generation circuit 9, is proportional to an ON duty of the driving pulse signal A, that is, proportional to an ON duty of the switch driving signal C. In the meantime, as the first output signal B1, the driving pulse signal A, which is output from the driving pulse generation circuit 7, may be directly used, so that the first output signal B1 has an ON duty, a phase and a frequency all same as those of the driving pulse signal A.

Next, an operation of a constant current control mode of the switching power supply circuit 1 will be described with reference to a specific example.

When an ON duty of the switch driving signal C is denoted as DT, a relationship between the input voltage Vin from the direct current voltage source Vdc and the output voltage Vout of the load part 4 is expressed by a following equation (2).

$$V_{out} = V_{in} \times DT \qquad (2)$$

Here, when it is assumed that the input voltage Vin is 400V and the output voltage Vout is 200V at an early stage of the operation of the switching power supply circuit 1, the ON duty DT is 0.5 (50%) from the equation (2). At this time, when the first output signal B 1, which is input from the driving pulse generation circuit 7 to the reference voltage generation circuit 9, is a pulse signal having a High level of 1.0V, a Low level of 0V and an ON duty of 0.5, a reference voltage that is output from the reference voltage generation circuit 9 to the error amplification circuit 10 becomes an average value of the first output signal B1, so that the reference voltage becomes a direct current voltage of 0.5V (=1.0V×0.5). In the meantime, when a load resistance is 200Ω, the output current Io flowing in the load part 4 is 1.0 A (=200V/200Ω). When a resistance value of the current detection element 5 (resistance element R1) of the current detection circuit 2 is 1.0Ω, a pulse current of 1.0 A having an ON duty of 0.5 flows in the current detection element 5 and is converted into a pulse voltage by the current detection element 5, which is then detected. The detected pulse voltage is output to the error amplification circuit 10 from the current detection circuit 2 via the low pass filter 6.

Since the output voltage becomes an average value of the pulse voltage by the low pass filter 6, it becomes a direct current voltage of 0.5V (=1.0 A×1.0 Ω×0.5).

Accordingly, at an early stage of the operation, the reference voltage, which is output from the reference voltage generation circuit 9 to the error amplification circuit 10, and the direct current voltage, which is output from the current detection circuit 2 to the error amplification circuit 10, have the same value (0.5V) and are balanced and stable.

If the load resistance of the load part 4 is changed into 100Ω from 200Ω for some cause, at first, the ON duty of the switch driving signal C is maintained as being 0.5 and the output voltage is maintained as being 200V, so that the output current is changed to 2.0 A (=200V/100Ω). At this time, while the reference voltage, which is output from the reference voltage generation circuit 9 to the error amplification circuit 10, is maintained as being 0.5V, the direct current voltage, which is output from the current detection circuit 2 to the error amplification circuit 10, becomes 1.0V (=2.0 A×1.0 Ω×0.5).

Thereby, a voltage proportional to the differential voltage (0.5V) is output from the error amplification circuit 10 to the driving pulse generation circuit 7 of the control circuit 3 and the driving pulse generation circuit 7 operates to reduce the ON duty of the driving pulse signal A to be output.

For example, when the ON duty of the driving pulse signal A that is output from the driving pulse generation circuit 7 is changed to 0.4 from 0.5, the output voltage Vout becomes 160V (=400V×0.4) from the equation (2) and the output current Io flowing in the load part 4 is reduced to 1.6 A (=160V/100Ω).

At this time, since the ON duty of the first output signal B1 that is output from the driving pulse generation circuit 7 to the reference voltage generation circuit 9 is changed to 0.4 in proportion to the driving pulse signal A, the reference voltage that is output from the reference voltage generation circuit 9 to the error amplification circuit 10 becomes 0.4V (=1.0V×0.4).

In the meantime, since the ON duty of the pulse voltage that is detected by the current detection element 5 becomes 0.4, the direct current voltage that is output from the current detection circuit 2 to the error amplification circuit 10 becomes 0.64V (=1.6 A×1.0 Ω×0.4).

Thereby, a voltage proportional to the differential voltage (0.24V) is output from the error amplification circuit 10 to the driving pulse generation circuit 7 of the control circuit 3 and the driving pulse generation circuit 7 continuously operates to reduce the ON duty of the driving pulse signal A to be output.

Assuming that the operation of reducing the ON duty is repeated and thus the ON duty of the driving pulse signal A, which is output from the driving pulse generation signal 7 to the driving circuit 8, becomes 0.25, the output voltage Vout becomes 100V (=400V×0.25) and the output current Io flowing in the load part 4 is reduced to 1.0 A (=100V/100Ω).

Since the ON duty of the first output signal B1 that is output from the driving pulse generation circuit 7 to the reference voltage generation circuit 9 is changed to 0.25 in proportion to the driving pulse signal A, the reference voltage that is output from the reference voltage generation circuit 9 to the error amplification circuit 10 becomes 0.25V (=1.0V×0.25).

In the meantime, since the ON duty of the detected voltage, which is detected by the current detection element 5, becomes 0.25, the direct current voltage that is output from the current detection circuit 2 to the error amplification circuit 10 also becomes 0.25V (=1.0 A×1.0 Ω×0.25).

As a result, the reference voltage, which is output from the reference voltage generation circuit 9 to the error amplification circuit 10, and the direct current voltage, which is output from the current detection circuit 2 to the error amplification circuit 10, have the same value (0.25V) and are balanced and stable.

The operation of the constant current control mode described above (the operation in which the ON duty of the driving pulse signal A is reduced so that the reference voltage, which is output from the reference voltage generation circuit 9 to the error amplification circuit 10, and the direct current voltage, which is output from the current detection circuit 2 to the error amplification circuit 10, are balanced) is performed in a moment. Accordingly, even when the load resistance of the load part 4 is changed from 200Ω to 100Ω, the output voltage Io is controlled to be constant, i.e., 1.0 A, as it is, and is held with stable state.

In the above descriptions, an example is described in which the load resistance of the load part 4 is reduced. However, the operation of the constant current control mode is performed so that the output current Io is held to be constant irrespectively of a change in input voltage or output voltage for various causes.

In the above descriptions, an example is described in which the first output signal B, which is input to the reference voltage generation circuit 9 from the driving pulse generation circuit 7, is the output signal B1 (the same signal as the driving pulse signal A) shown in FIG. 2. However, the first output signal B is not limited to the signal having the pulse waveform. For example, as shown in FIG. 2, like a pulse signal B2 having a different phase and the same ON duty (ON time of d11 and OFF time of d21 are same) or a pulse signal B3 having a different frequency (ON time of d12 and OFF time of d22 are different) and the same ON duty (d11:d21=d12:d22), the first output signal B may be different from the driving pulse signal A (further, switch driving signal C) with respect to the phase and the frequency inasmuch as the first output signal is a pulse signal having the same ON duty. When the first output signal B that is input to the reference voltage generation signal 9 from the driving pulse generation circuit 7 is made with a pulse signal having the same ON duty as that of the switch driving signal C, the reference voltage that is generated in the reference voltage generation circuit 9 becomes a voltage proportional to the ON duty of the switch driving signal C.

In this illustrative embodiment, while the direct current voltage that is output from the current detection circuit 2 is changed in proportion to the ON duty of the switch driving circuit C as the input voltage or output voltage is changed, the reference voltage that is generated in the reference voltage generation circuit 9 is generated to be proportional to the ON duty of the switch driving signal C. As a result, it is possible to precisely perform the constant current control ON the output current Io.

As described above, the switching power supply circuit 1 of this illustrative embodiment includes the reference voltage generation circuit 9 that inputs the output signal (first output signal) B, which is a pulse signal having an ON duty same as that of the switch driving signal C that is input to the switching element Q1, from the driving pulse generation circuit 7 of the control circuit 3 and thus generates a reference voltage proportional to the ON duty of the switch driving signal C and the error amplification circuit 10 that outputs error information between the voltage output from the current detection circuit 2, and the reference voltage output from the reference voltage generation circuit to the control circuit 3. The control circuit 3 changes the ON duty of the driving pulse signal A, which is output from the driving pulse generation circuit 7, based on the input error information and thus adjusts the ON duty of the switch driving signal C that is output from the driving circuit 8. Accordingly, it is possible to provide a switching power supply circuit having a simple circuit configuration and capable of precisely performing a constant current control on output current irrespectively of a change of an input voltage or output voltage.

Second Illustrative Embodiment

Next, a switching power supply circuit 1a according to a second illustrative embodiment of the present invention will be described. The constitutional elements corresponding to those of the switching power supply circuit 1 according to the first illustrative embodiment are indicated with the same reference numerals. In addition, the descriptions of the configurations common to those of the switching power supply circuit 1 according to the first illustrative embodiment will be omitted and the differences will be mainly described.

Figure 3:
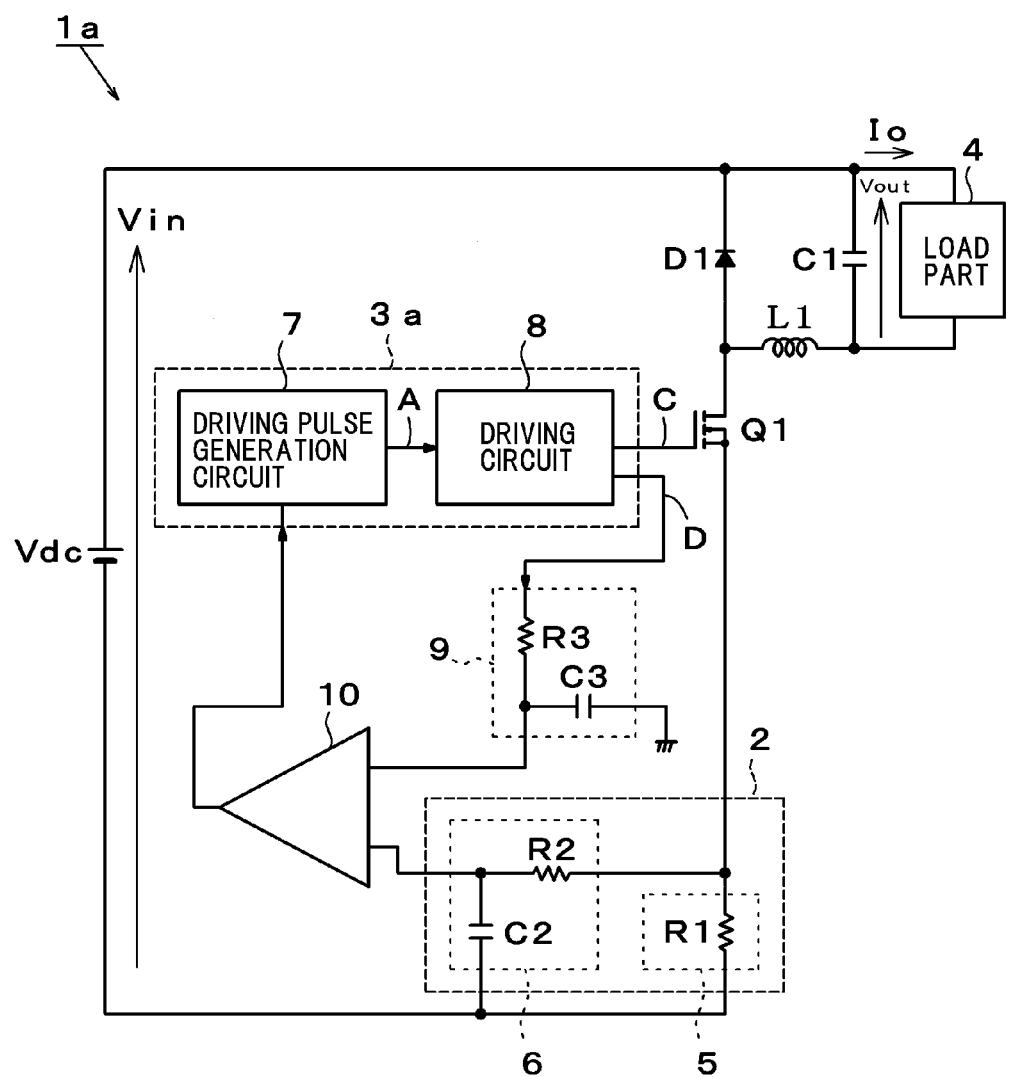
FIG. 3 is a circuit diagram showing a switching power supply circuit according to a second illustrative embodiment of the present invention.

FIG. 3 is a circuit diagram showing the switching power supply circuit 1a according to the second illustrative embodiment of the present invention.

As shown in FIG. 3, contrary to the switching power supply circuit 1 according to the first illustrative embodiment, in the switching power supply circuit 1a according to the this illustrative embodiment, a pulse signal that is input to the reference voltage generation circuit 9 is supplied from the driving circuit 8, rather than the driving pulse generation circuit 7 of a control circuit 3a.

The other configurations are the same as the first illustrative embodiment.

In the switching power supply circuit 1a according to the this illustrative embodiment, the reference voltage generation circuit 9 inputs an output signal (second output signal) D, which is the same pulse signal as the switch driving signal C output from the driving circuit 8 to the switching element Q1, from the driving circuit 8. Then, the reference voltage generation circuit averages the second output signal D by the low pass filter including the resistance element R3 and the capacitor C3, converts it into a direct current voltage and outputs the direct current voltage to the error amplification circuit 10, as a reference voltage. Since the reference voltage is the same signal as the second output signal B and further switch driving signal C, the reference voltage is proportional to the ON duty of the switch driving signal. In the meantime, as the second output signal D, the switch driving signal C, which is output from the driving circuit 8, may be directly used, so that the second output signal D has a ON duty, a phase and a frequency all same as those of the switch driving signal C.

The switching power supply circuit 1a configured as described above includes the reference voltage generation circuit 9 that inputs the second output signal D, which is a pulse signal having the same ON duty as the switch driving signal C that is input to the switching element Q1, from the driving circuit 8 of the control circuit 3a and thus generates a reference voltage proportional to the ON duty of the switch driving signal C and the error amplification circuit 10 that outputs error information between the voltage output from the current detection circuit 2 and the reference voltage output from the reference voltage generation circuit 9 to the control circuit 3a. The control circuit 3a changes the ON duty of the driving pulse signal A, which is output from the driving pulse generation circuit 7, based on the input error information and thus adjusts the ON duty of the switch driving signal C that is output from the driving circuit 8. Accordingly, as the switching power supply circuit 1 of the first illustrative embodiment, it is possible to provide a switching power supply circuit having a simple circuit configuration and capable of precisely performing a constant current control on output current regarding a change of an input voltage or output voltage.

While the present invention has been shown and described with reference to certain illustrative embodiments thereof, it will be understood by those skilled in the art that various changes in form and details may be made therein without departing from the spirit and scope of the invention as defined by the appended claims.

For example, in the switching power supply circuits 1, 1a of the first and second illustrative embodiments, the switching element Q1 is the MOSFET. However, the present invention is not limited thereto. For example, a bipolar type transistor may be used.

The voltage dropping converter of the illustrative embodiments is suitable for the converter circuit that configures the switching power supply circuit. In addition, a converter circuit such as a forward converter may be use, in which current detected by the current detection circuit is proportional to the product of output current and an ON duty.

In addition, regarding the load part 4, a type of load is not particularly limited and various loads can be connected. For example, an LED module in which a plurality of light emitting diodes (LEDs) is serially connected can be used.

In the above illustrative embodiments, the switching element Q1 is the low-side switching element. However, the inventive concept of the present invention can be also applied to a high-side switching element.

In the above illustrative embodiments, the operation mode of the switching power supply circuit assumes a continuous current mode. However, the inventive concept of the present invention can be also applied to an operation of a critical mode or discontinuous current mode.

What is claimed is:
1. A switching power supply circuit which is configured to receive a voltage from a direct current voltage source and supply a direct current power to a load part, the switching power supply circuit comprising:
   a switching element;

a current detection circuit which is serially connected to the switching element, and which is configured to convert a current flowing in the switching element into a voltage and detect the voltage;

a control circuit which is configured to output a switch driving signal to the switching element to control an ON/OFF operation of the switching element such that a current flowing in the load part becomes constant;

a reference voltage generation circuit which is configured to generate a reference voltage proportional to an ON duty of the switch driving signal; and an error amplification circuit which is configured to output error information between a voltage output from the current detection circuit and the reference voltage, to the control circuit, wherein the control circuit is configured to adjust the ON duty of the switch driving signal based on the error information.

2. The switching power supply circuit according to claim 1, wherein the control circuit includes:

a driving pulse generation circuit which is configured to generate a driving pulse signal; and a driving circuit which is configured to receive the driving pulse signal and output the switch driving signal for driving the switching element, and wherein the reference voltage is generated based on a first output signal output from the driving pulse generation circuit or a second output signal output from the driving circuit.

3. The switching power supply circuit according to claim 2, wherein the driving pulse signal is used as the first output signal to have an ON duty, a phase and a frequency all same as those of the driving pulse signal.

4. The switching power supply circuit according to claim 2, wherein the first output signal is a pulse signal having an ON duty same as that of the driving pulse signal and having a phase and/or a frequency different from those of the driving pulse signal.

5. The switching power supply circuit according to claim 2, wherein the switch driving signal is used as the second output signal to have an ON duty, a phase and a frequency all same as those of the switch driving signal.

6. The switching power supply circuit according to claim 1, wherein the switching element is a low-side transistor.

7. The switching power supply circuit according to claim 6, further comprising:

a voltage dropping type converter circuit including:
the transistor; and
a rectification smoothing circuit provided at a high side of the transistor.

8. The switching power supply circuit according to claim 1, wherein the current detection circuit includes:

a current detection element which is configured to convert a current flowing in the switching element into a voltage and detect the voltage; and a low pass filter which is configured to average the detected voltage.

* * * * *